Figure 1:
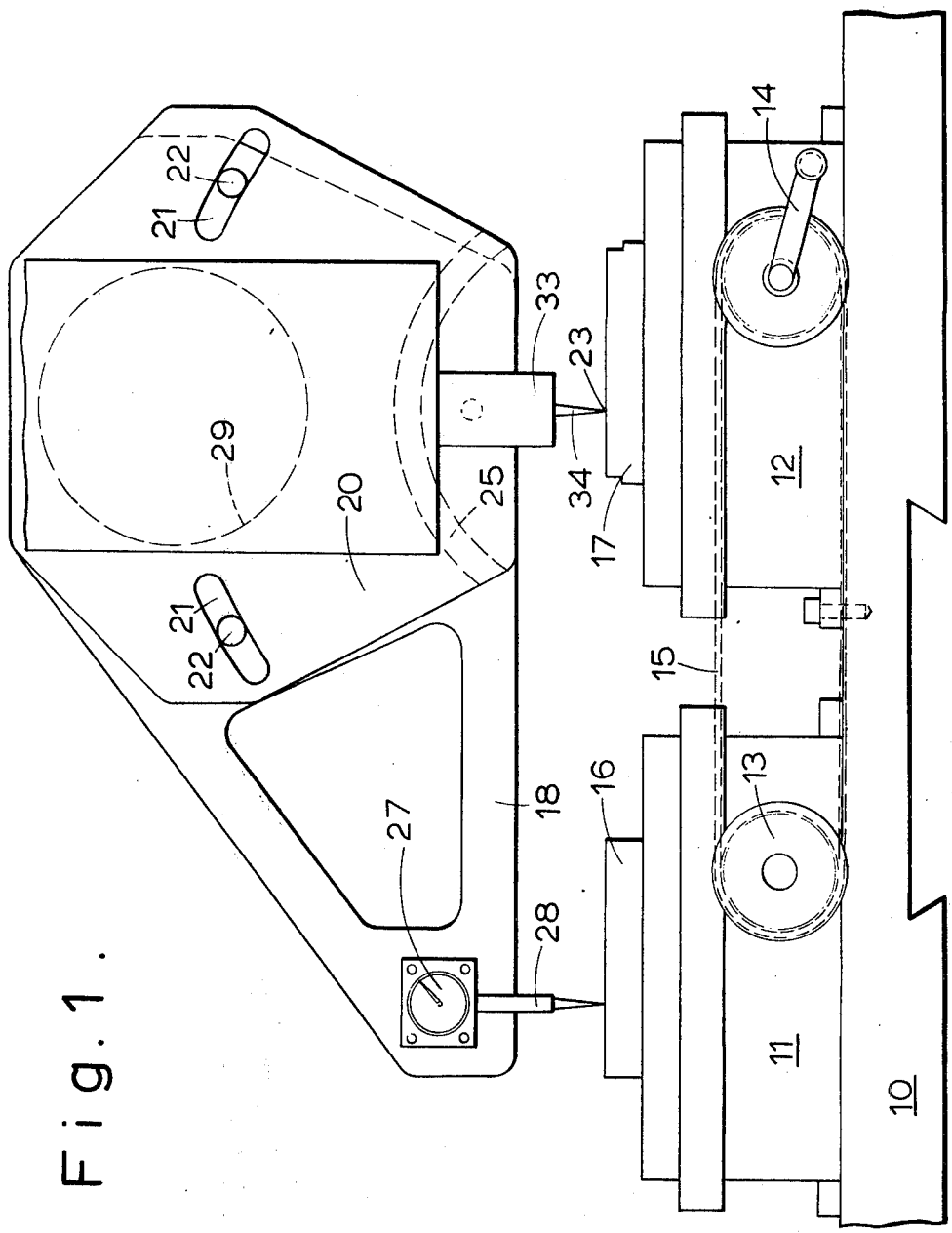

United States Patent [19]

Feldcamp

[11] 4,020,743
[45] May 3, 1977

[54] MILLING MACHINES WITH PIVOTAL HEAD

[76] Inventor: Edward George Feldcamp, Tudor Cottage, Church End, Twyning Tewkesbury, Gloucestershire, England

[22] Filed: Dec. 18, 1975

[21] Appl. No.: 641,938

[52] U.S. Cl. .................................. 90/13.3; 90/17
[51] Int. Cl.² ....................... B23C 1/16; B23C 1/12
[58] Field of Search ............... 90/13.3, 13.4, 13.6, 90/13.7, 17, 58 A, 58 B; 51/100 R, 100 P

[56] References Cited

UNITED STATES PATENTS

| 580,195 | 4/1897 | Pittler | 90/58 C |
|---|---|---|---|
| 2,445,971 | 7/1948 | Rosen | 90/13.4 X |
| 2,891,452 | 6/1959 | Zwick et al. | 90/58 B |
| 3,232,141 | 2/1966 | Swanson et al. | 90/17 X |
| 3,306,169 | 2/1967 | Glaude | 90/17 |
| 3,413,893 | 12/1968 | Wilson | 90/17 |

Primary Examiner—Harrison L. Hinson
Attorney, Agent, or Firm—Young & Thompson

[57] ABSTRACT

A milling machine comprising a base, a milling head mounted on the base for movement relative thereto about a horizontal pivot axis, means for holding the milling head in a selected angular position about said axis and drive means for transmission of drive to a milling cutter held, in use, by holding means on the head, said holding means and pivot axis being so disposed relative to one another that said pivot axis intersects the axis of rotation of the milling cutter at the cutting location.

5 Claims, 2 Drawing Figures

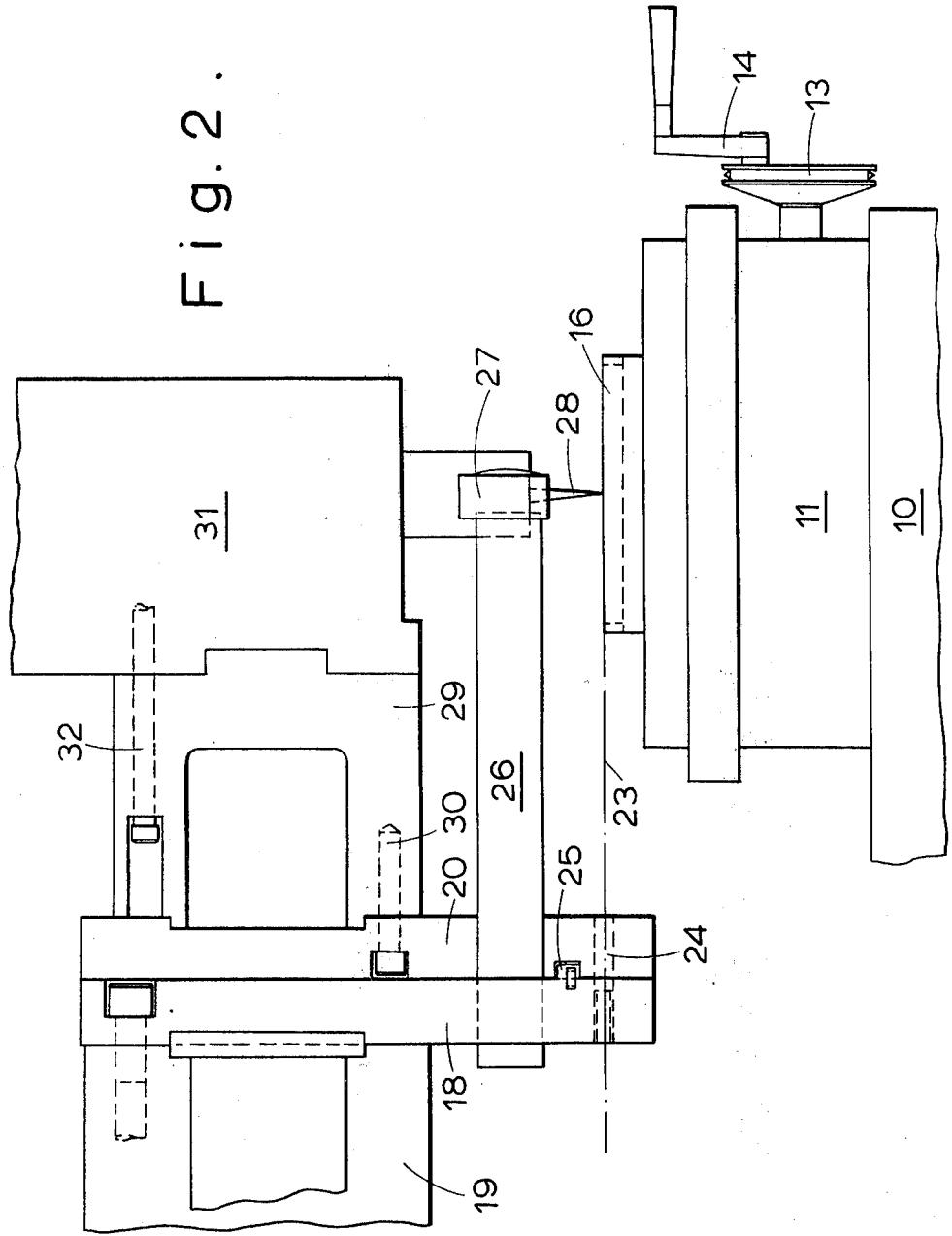

MILLING MACHINES WITH PIVOTAL HEAD

This invention relates to milling machines and has for its object the provision of improvements in milling machines.

During the milling of slots or recesses in workpieces, there are occasions when it is desirable that the sides of the slots or recesses should be inclined obliquely to the upper surface of the workpiece, i.e. that the axis of the milling cutter should be other than at right angles to said surface. With milling machines at present in use difficulties are encountered in obtaining controlled reproduceability of the required relative angular dispositions of the walls of the slots or recesses and it is accordingly a specific object of the invention to provide a milling machine the design of which is such as to facilitate the formation of slots or recesses having either divergent or convergent side walls.

When carrying out a milling operation using a "vapour mist" method of swarf removal, it is necessary to fit a cover or shield over the workpiece to ensure that the operator is not injured by flying swarf. The operator is thus not able to maintain constant visual supervision of the manner in which milling is effected and it is accordingly important that precise remote control is maintained. A further object of the invention is therefore to provide a milling machine having improved remote control means.

According to the invention a milling machine comprises a base, a milling head mounted on the base for movement relative thereto about a horizontal pivot axis, means for holding the milling head in a selected angular position about said axis and drive means for transmission of drive to a milling cutter held, in use, by holding means on the head, said holding means and pivot axis being so disposed relative to one another that said pivot axis intersects the axis of rotation of the bit at the cutting location.

The point of intersection of said axes thus provides a datum position which is maintained fixed and relative to which the milling head is movable in order to vary the inclination of the bit axis relative to the vertical and thus of said axis relative to the presented surface of a workpiece to vary the inclination of the wall of a slot or recess formed in the workpiece by the drilling operation. The workpiece is conveniently mounted on a table which is provided with means whereby it can be moved in three directions disposed mutually at right angles to one another, i.e. the table can be moved vertically and in two directions at right angles in a horizontal plane.

The milling head is preferably attached to a two-part framework the two parts of which are bolted together by means permitting relative angular adjustment of the parts about said horizontal axis, one of the parts being attached to the base of the milling machine and the other of the parts being attached to the milling head. The part fixed to the milling head is conveniently formed with a pair of angularly spaced arcuate slots having their centres of curvature lying on said horizontal pivot axis, the arcuate slots receiving the shanks of clamping bolts engaged with the other part of the framework. The extent of pivotal movement of the milling head about said horizontal pivot axis is thus limited by engagement of the shanks of the clamping bolts with the ends of the slots. In addition, the part of the framework fixed to the milling head may be formed with a series of bores containing radial bushings adapted to receive locating pins which enter bores in the other part of the framework, this arrangement facilitating setting of the milling head at each of a plurality of preselected angular positions.

The table on which the workpiece is mounted is conveniently a rotary table coupled to a copy table on which a template is mounted, the template being formed with a slot or recess the configuration of which corresponds to that required to be formed in the workpiece. The part of the framework fixed to the milling head conveniently has a transverse extension terminating in a clock and feeler gauge, the feeler gauge being arranged to engage the template on the copy table and the clock indicating the contact pressure between the template and gauge.

In order to remove the swarf obtained during drilling, a vapour mist apparatus is provided and, accordingly, the milling head is fitted with a plastics shield which encompasses the workpiece. In operation, the operator moves the copy table relative to the feeler gauge maintaining engagement between the gauge and the template and thus, as a result of the coupling together of the copy table and the worktable, the worktable is moved relative to the milling cutter and the required profile is formed in the workpiece.

The invention will now be described by way of example with reference to an embodiment thereof illustrated in the accompanying drawings in which:

FIG. 1 is a front view of a milling machine, and
FIG. 2 is a side view of the milling machine.

The milling machine includes a table 10 which is mounted on a supporting base (not shown) by means of a pair of slideways extending at right angles to one another. A pair of rotary tables 11 and 12 are mounted on the table 10 for rotation about spaced vertical axes, the tables 11 and 12 being rotatable by means of operating handles 13 and 14 which are interconnected by a chain 15 whereby the two tables 11 and 12 are rotated in unison. A template 16 is mounted on the rotary table 11 and a die plate 17 constituting the workpiece is mounted on the rotary table 12.

The base of the machine includes an upstanding pillar (not shown), the basic construction of the machine being in accordance with that sold under the name "Bridgeport." The pillar has a back plate 18 attached to it, the back plate 18 being disposed in abutting relationship with a part 19 of the pillar and with a front plate 20. A pair of arcuate slots 21 are formed in the front plate 20 and receive the shanks of locking bolts 22 disposed in bores in the back plate 18, the heads of the locking bolts 22 overlapping the sides of the slots 21 so that, when tightened, the two plates 18 and 20 are held against relative movement in a desired angular position with reference to a horizontal axis 23. The axis 23 may be the axis of a pivot pin 24 interconnecting the two plates 18 and 20 which together afford an adjustable framework. Alternatively (as shown in FIG. 1) or in addition (as shown in FIG. 2) an arcuate track element 25 is attached to the front face of the back plate and is received in an arcuate groove in the rear face of the front plate. As can be seen from FIG. 1, use of the track element 25 alone to provide the pivotal connection provides greater clearance permitting the milling of workpieces of greater horizontal dimensions.

An arm 26 is attached to a transverse extension of the back plate 18 and extends parallel to the horizontal axis 23. A clock attachment 27 and feeler gauge 28 in the form of a tracer needle are mounted at the forward end of the arm 26 and are arranged so that the gauge 28 may follow the contour of the preformed shape of a groove or channel formed in the template 16. A collar 29 is attached to the front plate 20 by bolts 30 and a milling head 31 is attached to the collar 29 by bolts 32. The milling head 31 includes a drive motor (not shown) which transmits drive to a chuck 33 holding a milling cutter 34, the lowermost point or tip of which is disposed on the horizontal axis 23.

In use, the operator moves the template 16 so that the feeler gauge 28 follows the contour of the template 16 and, because any movement of the copy table 11 results in corresponding movement of the rotary table 12 on which the die plate 17 is mounted, the required relative movements between the milling cutter 34 and the die plate 17 are effected. When it is desired to adjust the inclination of the milling cutter 34 to alter the inclination of a side wall of the groove formed in the die plate, the locking bolts 22 are released, the relative positions of the two plates 18 and 20 are adjusted and the locking bolts 22 retightened. As the two plates 18 and 20 are moved relative to one another about the axis 23, such adjustment of the inclination of the milling cutter 34 does not alter the relationship between the positions of the tips of the gauge 28 and of the cutter 34 so that no resetting operation is required.

Swarf removal is effected by a vapour mist process which involves blowing oil vapour into the groove formed in the die plate. The die plate 16 is surrounded by a plastics shield (not shown) to protect the operator from flying swarf but little delay is caused by the reduction in visibility of the operator since he is principally concerned with ensuring that the feeler gauge 28 follows the outline of the template 16 and not with maintaining a visual watch on the progress of the milling cutter 34.

The apparatus is particularly suited for the production of extrusion dies for use in the extrusion of aluminium, adjustability of the inclination of the side walls of the channel or slot formed in the die being of considerable importance.

What I claim is:

1. A milling machine comprising a milling head with a downwardly projecting milling cutter, a table on which a workpiece is mounted, said table being movable beneath the milling cutter, and mounting means for the milling head comprising a two-part framework, one of the two parts carrying the milling head and being bolted to the other in adjustable angular relation about a horizontal axis, the parts having constraining mutual engagement such that said horizontal axis lies below the milling head and intersects the axis of the milling cutter at the cutting location.

2. A milling machine according to claim 1, wherein said constraining mutual engagement is provided by arcuate guideways having their centers of curvature lying on said horizontal axis below the milling head.

3. A milling machine according to claim 2, wherein said arcuate guideways comprise arcuate bolt slots and an arcuate groove below the bolt slots.

4. A milling machine according to claim 1, wherein said constraining mutual engagement is provided by arcuate bolt slots together with a pivot pin linking the two parts of the framework at said horizontal axis below the milling head.

5. A milling machine according to claim 1, including a copy table coupled to said work-piece table and a feeler gauge mounted over the copy table on an extension of that part of the framework to which the part carrying the milling head is bolted in adjustable angular relation.

* * * * *